United States Patent [19]

Nieuweboer

[11] 4,081,686

[45] Mar. 28, 1978

[54] X-RAY FILM CASSETTE AND METHOD OF MAKING SAME

[75] Inventor: Gerrit Nieuweboer, Claymont, Del.

[73] Assignee: E. I. Du Pont de Nemours and Company, Wilmington, Del.

[21] Appl. No.: 768,846

[22] Filed: Feb. 15, 1977

[51] Int. Cl.² ............................................. G03B 41/16
[52] U.S. Cl. .................................. 250/480; 250/475; 250/481
[58] Field of Search ................ 250/475, 480, 481, 482

[56] References Cited

U.S. PATENT DOCUMENTS

| | | | |
|---|---|---|---|
| 3,153,145 | 10/1964 | Yerkovich | 250/481 |
| 3,958,125 | 5/1976 | Zechmair et al. | 250/480 |
| 4,032,790 | 6/1977 | Nakamura | 250/480 |

*Primary Examiner*—Archie R. Borchelt

[57] ABSTRACT

An X-ray film cassette is formed of a pair of hinged plates, both arched inwardly about axes parallel to the hinge axis. One of the plates is formed from an inwardy curved piece of sheet metal prestressed by clamping it into an edge frame. The inside surfaces of each plate may carry X-ray intensifying screens. A method of prestressing the one plate is also disclosed.

8 Claims, 7 Drawing Figures

U.S. Patent   March 28, 1978   Sheet 1 of 2   4,081,686
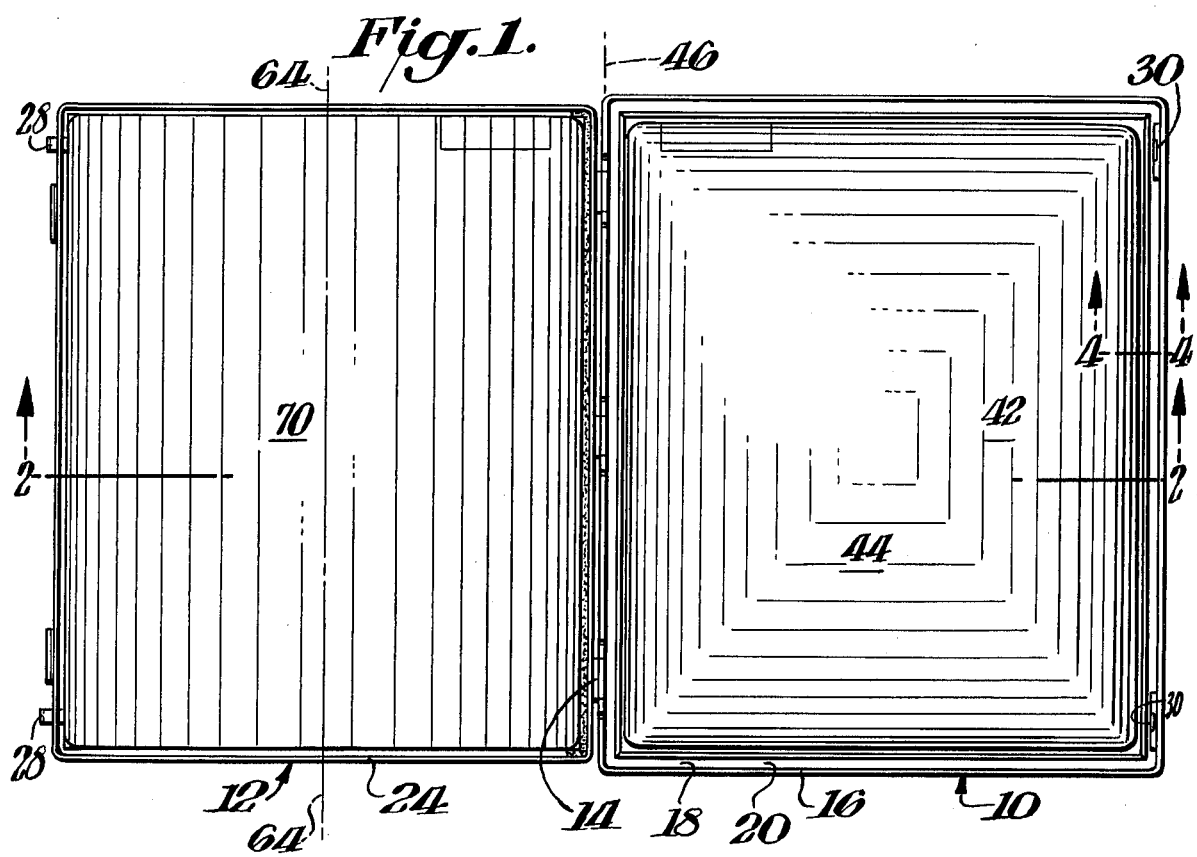
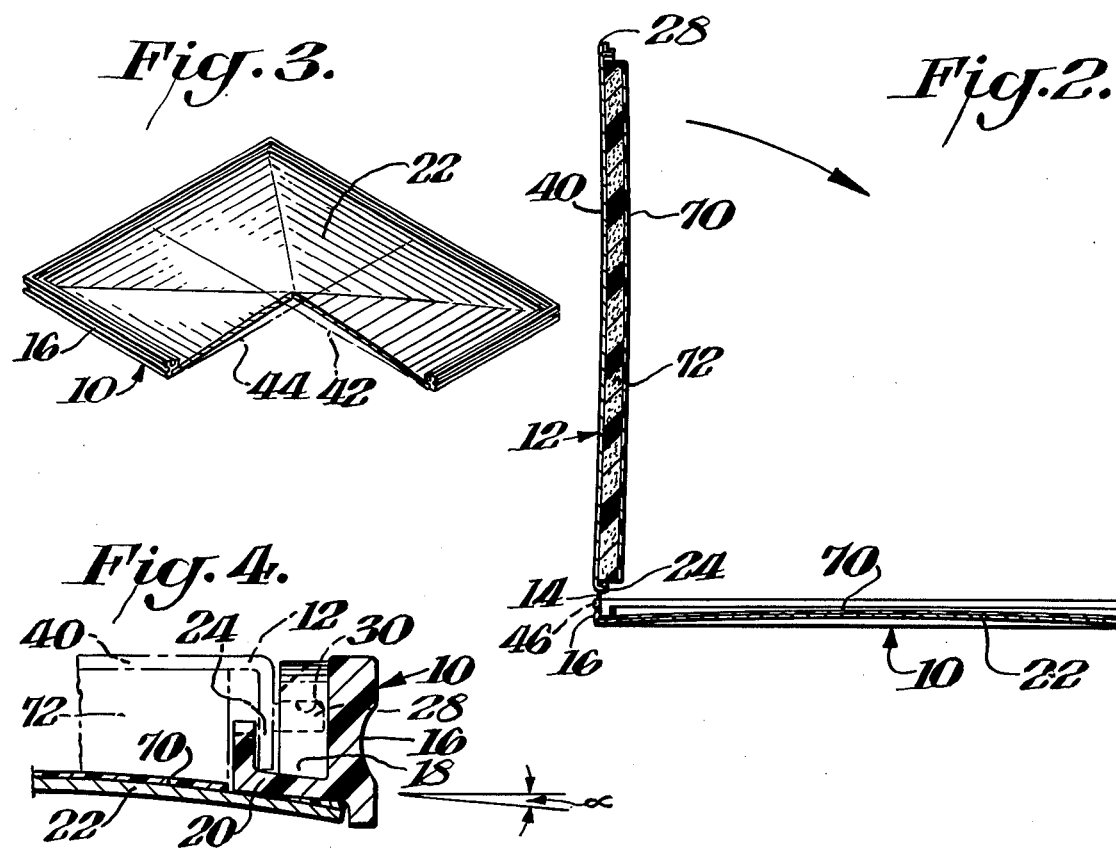

X-RAY FILM CASSETTE AND METHOD OF MAKING SAME

BACKGROUND OF THE INVENTION

This invention relates to X-ray film cassettes and, more particularly, to an X-ray film cassette capable of providing forces on the film that vary across the surface of the cassette and to a method of making the same.

Much work has been devoted over the years to the making of X-ray film cassettes. There is a particular problem encountered in making such cassettes for medical purposes in that X-ray intensifying screens must be used to accommodate the film to the lower X-ray energy levels used on humans. Intensifying screens fluoresce under X-ray bombardment and thus release light energy to aid in the exposure of the adjacent X-ray film. These screens are placed on the front (and back) sides of the cassette on either side of the film. The film must be clamped tightly in-between these two intensifying screens. If the intensifying screens are not maintained in intimate contact with the X-ray film, the fluorescing light tends to become diffused and the X-ray image blurred.

This problem is not particularly severe until such time as large area films are employed. With such large films, it becomes relatively difficult to maintain the desired pressure profile across the entire surface of the film. Reinforcing materials cannot be used across the faces of the cassette without causing unwanted shielding and shadows within the X-ray image itself. Likewise, thick materials having greater rigidity cannot be used since they are more dense and block the passage of X-rays. A further problem arises with the large area films in that the surfaces tend to trap air, particularly within the center region of the film, when the cassette is closed. This in and of itself causes unwanted separation between the intensifying screen and the film and hence a blurring of the image.

To alleviate many of these problems, certain of the prior art cassettes provided plates with some inward curvature, hoping to alleviate the air pockets and supply sufficient pressure. Exemplary of such cassettes are those described by Canadian Pat. No. 843,519, issued June 2, 1970 to Frederick F. Tone and U.S. Pat. No. 3,153,145, issued Oct. 13, 1954 to Simon Yerkovich.

While cassettes of this type did represent a significant advance over the art, the utilization of curved plates in and of itself did not entirely alleviate the problem. Air could still be trapped; film screen contact variations are noticeable in the film when developed because air entrapment produced undesired regions of blurring.

It is therefore an object of this invention to alleviate many of the disadvantages of the prior art X-ray film cassettes.

Another object of this invention is to provide an improved X-ray film cassette that is particularly useful with large area X-ray films.

A further object of this invention is to provide an improved method of manufacturing X-ray film cassettes.

BACKGROUND OF THE INVENTION

In accordance with this invention, a cassette for holding X-ray sheet film during exposure to radiation comprises first and second hinged, interlocking, flexible plates having a hinge axis, the plates each having an inner surface, latch means for securing the plates together such that their inner surfaces are in closed, mating relationship, the first plate defining only an inwardly protruding curve about an axis parallel to said hinge axis, th second plate defining a complex curve arched toward said first plate in two directions substantially at right angles to eac other, and an X-ray intensifying screen on one of said inner surfaces.

In one embodiment of the invention a planar frame is used to prestress the second plate, which is formed from a partially curved member arcuate about an axis parallel to said hinge axis and secured at its edge portions to said frame. This has the advantage of permitting a greater pressure to be applied in the center surface area of the X-ray film such that the intensifying screen (s) are held in intimate contact with one or both sides of the film, and the danger of air entrapment is reduced.

According to the method of this invention, a cassette for holding X-ray sheet films during exposure to radiation is formed, the cassette having first and second hinged, interlocking plates, the plates having a hinge axis, with the second plate secured in a frame, and latch means for securing said plates together in a closed, mating relationship, the method comprising the steps of forming a first flexible plate to define a curved surface protruding toward said second plate, about an axis parallel to said hinge axis, forming a partially curved plate, positioning the curved plate in the frame oriented such that the curved plate is arcuate about an axis parallel to the hinge axis, clamping the curve plate into the plane of said frame, securing the edge of the curved plate to the frame while so clamped, thereby forming said second plate, and attaching an X-ray intensifying screen to one of said plates.

BRIEF DESCRIPTION OF THE DRAWINGS

Further advantages and features of this invention will become apparent upon consideration of the following description wherein:

FIG. 1 is a plan view of an opened X-ray cassette constructed in accordance with this invention;

FIG. 2 is a cross-sectional, side view of the X-ray cassette depicted in FIG. 1 taken along the section lines 2—2;

FIG. 3 is a pictorial view, partially cut away, of the prestressed front plate of the cassette and its frame constructed in accordance with this invention.

FIG. 4 is a fragmentary cross-sectional view of the front plate frame taken along the section line 4—4 particularly depicting a manner in which the prestressed plate is secured thereto;

DESCRIPTION OF THE PREFERRED EMBODIMENT

Figure 5:
FIG. 5 is a diagrammatic representation of one step performed in the manufacture of the front plate in accordance with a preferred embodiment of this invention.

Broadly speaking, the cassette of this invention is designed to accommodate large area X-ray films. The cassette itself, as seen in FIGS. 1 and 2, comprises a front plate 22, secured by a frame 10, and a cover plate 12 pivotally connected together as by hinges 14. In this instance, three hinges are used along a common edge of the frame 10 and cover plate 12. It should be understood, however, that a continuous type hinge could also be used. The outer ones of the hinges 14 should be relatively close to the corners of the cassette.

The front plate frame 10 is rectangular in shape and formed by a U-shaped channel 16 (FIG. 4). The channel portion 18 is adapted to receive, as will be described, an interlocking edge flange 24 of the cover 12 to provide a light-tight cassette as is customary in the prior art. The lower piece or flange 20 of the channel, in a preferred embodiment, is angled slightly upward from the plane of the frame for reasons as will be described to better accommodate the front plate 22.

The cover plate 12 has L-shaped edge flanges 24 with the upright portion of the L being adapted to enter into the channel 18 of the front plate frame 10. A pair of conventional latch mechanisms comprising a tongue 28 and a mating slot 30 are secured respectively in the cover plate 12 and to the inside edge of the frame 10. The latch 28-30 may be otherwise conventional. The latch tongue 28 may be spring loaded such that after it is retracted and the frame is closed, it may spring forward to engage the slots 30. A tab 32 (or a pair of tabs) forms a handle to facilitate the lifting of cover plate 12. Thus far described, the cassette is somewhat conventional.

In accordance with this invention, a cassette is formed by a method which involves prestressing the front plate 22 and securing it within the front plate frame 10.

The front plate is prestressed such that it is arcuate and defines a complex curve that is bowed or arched toward the cover plate 12. Thus prestressed, the front plate 22 is arched toward the cover plate 12 in two directions depicted by the axes 42 and 44, respectively, which are substantially at right angles to each other as is seen most clearly in FIG. 3. One axis 42 is parallel to an axis 46 of the hinges 14.

The front plate 22 is formed by selecting a plate of a flexible material having a relatively high tensile strength and having a low density to X-rays. Suitable materials for this purpose may be aluminum or various known plastic laminates which have a relatively high rigidity. Whatever the material employed, it is formed until it is arcuate about one axis (42). The axis 42 is selected such that when the plate is installed, as will be described, within the front plate frame 10, the axis lies parallel to the axis 46 of the hinges 14. The formed plate has a bowed shape which typically within a 14 inch span will have a radial chordal segment of about one inch or less. The bowed plate is now placed, as depicted in FIG. 5, in a clamp 48 and the center portion of the plate pressed as at 52 so as to lie in a relatively flat plane. The front plate frame 10 is now placed over the edges of the clamped plate 22 (FIG. 5) with the flange 20 contacting the plate. A layer of epoxy 50 or other suitable adhesive is used to bond the two. After the epoxy is allowed to cure, the plate 22 and frame are removed from the clamp. The plate 22 now assumes the configuration, as seen in FIG. 3, which is a complex curve, generally convex in shape, arched or bowed along two directions 42,44.

Figure 6:
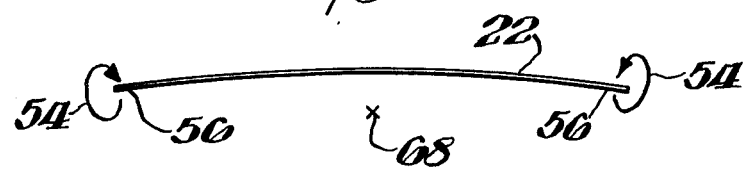
FIG. 6 is a diagrammatic representation of the torque applied to the front plate by the frame.

The front plate frame 10 exerts a torque, as depicted by the arrows 54 in FIG. 6, on each of the edges 56 of the plate 22, which torque acts to force the bowed plate 10 towards a flat plane, thereby prestressing the front plate to complete the construction of the cassette. The cover plate 12 is formed by slightly bending or bowing it about an axis 64 parallel to the axis 46 of the hinge. Typically, a bend of ¼ inch over a span of 14 inches is used. Lesser bends may be used although, as the bend is decreased, there may be some tendency for an air pocket to form in the center when the cassette is closed, particularly for the larger area cassettes. The plate is arched inwardly toward the front plate 22 as will be described.

In use, the cassette, when closed, is capable of providing the desired pressure profile or gradient across the surface as described. This desired pressure gradient is one which increases the pressure between the film and plates in the center portion of the plates, and is provided, in accordance with the cassette of this invention, by the use of the prestressed plate 22, i.e., the uniquely configured prestressed front plate 22 and the cover plate 12 act together to provide this pressure profile. The cover plate 12, arched inwardly only about the axis 64, cooperates with the prestressed front plate 22, which is arched initially inwardly about the axis 68 (FIG. 6) which is parallel to the axis 46 of the hinges 14. Securing the edges 56 of the front plate 22 by the frame 10 prestresses the plate and causes this complex plate curvature described. This curvature, as exhibited on the inner surface of the plate 22, is generally convex in two mutually perpendicular directions 42,44 (FIG. 3) and provides a pressure gradient which is greater at the center than at the edges. This reduces the chance of air pockets and insures excellent contact over the entire surface between the film and the intensifying screens. A pad 72 of a resilient material such as a polyether foam is glued or otherwise attached to the inside surface of the cover 12. Finally, an X-ray intensifying screen 70 of conventional design is adhered to the inside (the side which contacts the film) surface of the pad 72, and a similar screen 70 is adhered to the inside surface of the front plate 22. Typically, a foam of one pound per cubic foot density is used although other light foams may be used as well. Preferably, the frame and the plates are made of aluminum, however, other suitable materials may be used as desired; the only critical requirement being that the front plate 22 must have a low X-ray absorption.

Figure 7:
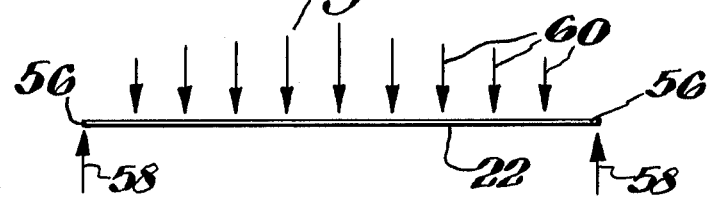
FIG. 7 is a diagrammatic force representation of the forces acting upon the front plate when the cassette is in a closed condition.

When the cassette is closed, additional stress is applied across the surface area of the prestressed front plate, as depicted in FIG. 7, with the frame acting, as depicted by the arrows 58, on the edges 56 of the plate 22. The cover plate 12 cooperates with the front plate to provide a pressure profile, as depicted by the length of the arrows 60, across the surface area of the plate with a greater force acting on the center portion. It will be noted that in this condition, the plate 10 is nearly flat under stress, yet the frame 10 is not exerting any torque. This serves a unique advantage in that the prestressed plate 22 is able to provide the varying pressure load across the entire surface area of the plate with the pressure in the center higher than around the edges. This condition is particularly capable of providing the necessary force at the center portion to prevent air pockets from forming. The prestressed plate of this invention is a distinct advantage over many of the prior art cassettes which rely upon a frame to apply the necessary torque to the plate which in turn applies the pressure across the surface area of the plate.

In an alternative embodiment, the cover plate may be flat and planar although this is not the preferred embodiment in that on occasion, air can become trapped in the center portion.

I claim:

1. A cassette for holding X-ray sheet film during exposure to radiation, said cassette comprising, in combination:

first and second hinged, interlocking, flexible plates, said plates having a hinge axis, said plates each having an inner surface;

latch means for securing said plates together such that their inner surfaces are in closed, mating relationship;

said first plate defining only a curve protruding toward said second plate, about an axis parallel to said hinge axis;

said second plate defining a complex curve arched toward said first plate in two directions substantially at right angles to each other; and an X-ray intensifying screen on one of said inner surfaces.

2. The cassette of claim 1 wherein a resilient pad is disposed between said screen and said first plate inner surface.

3. The cassette of claim 1 which includes a frame, and wherein said second plate is prestressed by being formed from a partially curved member arcuate about an axis parallel to said hinge axis and secured at its edge portions to said frame.

4. The cassette of claim 3 wherein said frame defines a flange extending inwardly in the plane of said frame, said second plate being adhesively secured to said flange.

5. The cassette of claim 4 wherein said flange is angled to conform to the contour of the edges of said second plate.

6. A method of forming a cassette for holding X-ray sheet films during exposure to radiation, said cassette having first and second hinged, interlocking plates, said plates having a hinge axis, said second plate secured in a frame, and latch means for securing said plates together in closed, mating relationship, comprising the steps of:

forming a first flexible plate to define a curved surface, protruding toward said second plate, about an axis parallel to said hinge axis;

forming a partially curved plate, positioning said curved plate in said frame oriented such that said curved plate is arcuate about an axis parallel to said hinge axis;

clamping said curved plate into the plane of said frame;

securing the edges of said curved plate to said frame while so clamped to form a complex curve, thereby forming said second plate; and attaching an X-ray intensifying screen to one of said plates.

7. A cassette for holding X-ray sheet film during exposure to radiation, said cassette comprising, in combination first and second hinged, interlocking, flexible plates, said plates having a hinge axis, said plates each having an inner surface;

latch means for securing said plates together such that their inner surfaces are in closed, mating relationship;

said second plate being prestressed to define a complex curve arched toward said first plate in two directions substantially at right angles to each other; and an X-ray intensifying screen on one of said inner surfaces.

8. The cassette of claim 7 which includes a planar frame, said second plate is prestressed by being formed from a partially curved member arcuate about an axis parallel to said hinge axis and secured at its edge portions to said frame; and said first plate defines a curve protruding toward said second plate, about an axis parallel to said hinge axis.

* * * * *

Disclaimer 4,081,686.—*Gerrit Nieuweboer*, Claymont, Del. X-RAY FILM CASSETTE AND METHOD OF MAKING SAME. Patent dated Mar. 28, 1978. Disclaimer filed Nov. 12, 1980, by the assignee, *E. I. du Pont de Nemours and Company*.

Hereby enters this disclaimer to claim 5 of said patent.

[*Official Gazette January 6, 1981.*]